United States Patent
Ju et al.

(10) Patent No.: US 10,402,627 B2
(45) Date of Patent: Sep. 3, 2019

(54) METHOD AND APPARATUS FOR DETERMINING IDENTITY IDENTIFIER OF FACE IN FACE IMAGE, AND TERMINAL

(71) Applicant: HUAWEI TECHNOLOGIES CO., LTD., Shenzhen, Guangdong (CN)

(72) Inventors: Wenqi Ju, Shenzhen (CN); Wei Li, Shenzhen (CN); Chunjing Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 15/639,220

(22) Filed: Jun. 30, 2017

(65) Prior Publication Data

US 2017/0300744 A1   Oct. 19, 2017

Related U.S. Application Data

(63) Continuation of application No. PCT/CN2015/098568, filed on Dec. 24, 2015.

(30) Foreign Application Priority Data

Jan. 4, 2015   (CN) .......................... 2015 1 0003813

(51) Int. Cl.
   *G06K 9/00*   (2006.01)
   *G06K 9/62*   (2006.01)

(52) U.S. Cl.
   CPC ........... *G06K 9/00288* (2013.01); *G06K 9/00* (2013.01); *G06K 9/00268* (2013.01); *G06K 9/6278* (2013.01)

(58) Field of Classification Search
   CPC .......... G06K 9/42; G06K 9/6277; G06K 9/66; G06N 9/00

(Continued)

(56) References Cited

U.S. PATENT DOCUMENTS 6,067,369 A * 5/2000 Kamei ............... G06K 9/00087
                                                    382/125
8,422,739 B2   4/2013 Ianculescu et al.
(Continued)

FOREIGN PATENT DOCUMENTS

CN   1497889      5/2004
CN   101615248    12/2009
(Continued)

OTHER PUBLICATIONS

International Search Report, dated Mar. 24, 2016, in International Application No. PCT/CN2015/098568 (4 pp.).

(Continued)

*Primary Examiner* — Jerome Grant, II
(74) *Attorney, Agent, or Firm* — Conley Rose, P.C.

(57)   ABSTRACT

The present invention provides a method and an apparatus for determining an identity identifier of a face in a face image, and a terminal. The method includes: obtaining an original feature vector of a face image; selecting k candidate vectors from a face image database; selecting a matching vector of the original feature vector from the k candidate vectors; and determining, an identity identifier that is of the matching vector. In embodiments of the present invention, a face image database stores a medium-level feature vector formed by means of mutual interaction between a low-level face feature vector and autocorrelation and cross-correlation submatrices in a joint Bayesian probability matrix. The medium-level feature vector includes information about mutual interaction between the face feature vector and the autocorrelation and cross-correlation submatrices in the joint Bayesian probability matrix, so that efficiency and accuracy of facial recognition can be improved.

12 Claims, 5 Drawing Sheets

(58) Field of Classification Search
USPC .......................................................... 382/118
See application file for complete search history.

(56) References Cited

U.S. PATENT DOCUMENTS

| | | | |
|---|---|---|---|
| 8,494,231 B2 | 7/2013 | Folta et al. | |
| 8,705,875 B1* | 4/2014 | Ricanek, Jr. ....... | G06K 9/00288 382/159 |
| 8,818,746 B1 | 8/2014 | Johnson et al. | |
| 2004/0052236 A1 | 3/2004 | Hwang et al. | |
| 2004/0190776 A1 | 9/2004 | Higaki et al. | |
| 2008/0123907 A1* | 5/2008 | Eura ................. | G06K 9/00288 382/118 |
| 2009/0097713 A1* | 4/2009 | DeLean ................. | G06F 21/32 382/115 |
| 2009/0268888 A1* | 10/2009 | Hsu ................... | H04M 1/27455 379/93.23 |
| 2011/0058743 A1* | 3/2011 | Myers ................ | G06K 9/00288 382/190 |
| 2011/0074970 A1* | 3/2011 | Sukegawa .......... | G06K 9/00261 348/222.1 |
| 2015/0055834 A1* | 2/2015 | Zou .................... | G06K 9/00281 382/118 |
| 2015/0092996 A1* | 4/2015 | Tian ................... | G06K 9/00281 382/118 |
| 2016/0070956 A1 | 3/2016 | Lu et al. | |
| 2016/0125232 A1* | 5/2016 | Zhang ..................... | H04N 5/77 382/103 |
| 2016/0148080 A1* | 5/2016 | Yoo ...................... | G06K 9/4628 382/157 |
| 2018/0189541 A1* | 7/2018 | Chang ................ | G06K 9/00013 |
| 2018/0189635 A1* | 7/2018 | Olarig ...................... | G06N 3/04 |

FOREIGN PATENT DOCUMENTS

| | | |
|---|---|---|
| CN | 103020655 | 4/2013 |
| CN | 103514456 | 1/2014 |
| CN | 103824045 | 5/2014 |
| CN | 103901401 | 7/2014 |
| CN | 104239858 | 12/2014 |
| CN | 104573652 | 4/2015 |
| EP | 1477924 | 5/2007 |
| WO | WO2005096213 | 10/2005 |
| WO | WO2006048809 | 5/2006 |

OTHER PUBLICATIONS

Search Report, dated Apr. 19, 2017, in Chinese Application No. 2015100038130 (2 pp.).
Office Action, date Apr. 28, 2017, in in Chinese Application No. 2015100038130 (4 pp.).
Viola, P. et al., *Robust Real-Time Object Detection*, Second International Workshop on Statistical and Computational Theories of Vision—Modeling, Learning, Computing, and Sampling, Vancouver, Canada, Jul. 13, 2001, pp. 1-25.
Zeng, Y. et al., *Face Recognition Algorithm Based on Binary Bayesian Subspace*, Computer Engineering, vol. 37, No. 5, Mar. 2011, pp. (3 pp.).
Kalal, Z. et al., *Tracking-Learning Detection*, IEEE Transactions on Pattern Analysis and Machine Intelligence, vol. 34, No. 7, Jul. 2012, pp. 1409-1422.
XP047018987, Dong Chen et al., *Bayesian Face Revisited: A Joint Formulation*, Oct. 7, 2012 Computer Vision ECCV 2012, Springer Berlin, pp. 566-579.
XP004321213, Moghaddam, B. et al, *Bayesian face recognition*, Pattern Recognition Elsevier, GB, vol. 33, No. 11, Nov. 2000, pp. 1771-1782.
XP032232370, Kapoor, A. et al, *Memory constrained face recognition*, Computer Vision and Pattern Recognition (CVPR), Jun. 16, 2012, pp. 2539-2546.
XP55416911, Santamaria Mauricio Villegas, *Face Analysis and Recognition in Mobile Devices*, Nov. 2008, Valencia, ES.
XP019018434, Andrea F. Abate et al., *One to Many 3D Face Recognition Enhanced Through k-d-Tree Based Spatial Access*, Jan. 2005, Advances in Multimedia Information Systems, LNCS, Springer, Berlin, DE, pp. 5-16.
Extended European Search Report, dated Oct. 30, 2017, in European Application No. 15875160.2 (8 pp.).

* cited by examiner

METHOD AND APPARATUS FOR DETERMINING IDENTITY IDENTIFIER OF FACE IN FACE IMAGE, AND TERMINAL

CROSS-REFERENCE TO RELATED APPLICATIONS

This application is a continuation of International Application No. PCT/CN2015/098568, filed on Dec. 24, 2015, which claims priority to Patent Application No. 201510003813.0, filed on Jan. 4, 2015, The disclosures of the aforementioned applications are hereby incorporated by reference in their entireties.

TECHNICAL FIELD

The present invention relates to the communications field, and more specifically, to a method and an apparatus for determining an identity identifier of a face in a face image, and a terminal.

BACKGROUND

Facial recognition is a popular computer technology in recent years and is one of biometric recognition technologies. The biometric recognition technologies further include fingerprint recognition, iris recognition, and the like. These recognition technologies can achieve a high recognition rate. However, when these biometric recognition technologies are applied, a to-be-recognized person needs to cooperate well. That is, these recognition technologies have a strict requirement for a person and an environment, so that application of these technologies, for example, in a public place, a densely populated place, and a non-compulsory civil field, is greatly limited. Facial recognition can break through the foregoing limitation, and is more widely applied.

After decades of development, many methods are generated for the facial recognition technology, for example, template matching, learning from examples, and a neural network. A facial recognition method based on a joint Bayesian probability model is a common facial recognition method. Using the joint Bayesian probability model to verify whether two face images are face images of a same person has high accuracy. The following briefly describes the facial recognition method based on the joint Bayesian probability model.

First, a joint Bayesian probability matrix P is generated by means of training. Then a feature v1 of a to-be-verified face f1 and a feature v2 of a to-be-verified face f2 are extracted separately. Next, the v1 and the v2 are spliced into a vector [v1,v2], and finally a distance between the v1 and the v2 is calculated by using the following formula (1):

$$s=[v1,v2]*P*[v1,v2]^T \quad (1)$$

When the distance is less than a preset threshold, the f1 and the f2 are of the same person; when the distance is greater than the preset threshold, the f1 and the f2 are of different persons. The joint Bayesian probability matrix P may be obtained by means of offline learning. When the joint Bayesian probability matrix P is learned, the entire matrix P may be directly learned, or the P matrix may be decomposed by using the following formula (2):

$$s = [v1, v2] * \begin{bmatrix} A & B \\ B & A \end{bmatrix} * [v1, v2]^T \quad (2)$$

A submatrix A and a submatrix B are quickly learned separately. A is a cross-correlation submatrix in the joint Bayesian probability matrix P, and B is an autocorrelation submatrix in the joint Bayesian probability matrix P. When this method is used for facial recognition, a face image database needs to be pre-established. Each vector in the face image database corresponds to one identity. In a recognition process, the feature vector v1 of the face f1 needs to be compared with each vector in the face image database by using the formula (1) or the formula (2), to obtain a distance s between the feature vector v1 and the vector in the face image database; and a vector having a smallest distance from the v1 is selected from the face image database as a matching vector of the v1. When a distance between the matching vector and the v1 is less than the preset threshold, an identity corresponding to the matching vector in the face image database is determined as an identity of the f1. When the distance between the matching vector and the v1 is greater than the preset threshold, it indicates that the identity of the face f1 is not recorded in the face image database, and a new identity may be allocated to the f1 and a correspondence between the new identity and the v1 is established in the database.

It can be seen from the foregoing description that when a facial recognition method based on a joint Bayesian probability model is used, a to-be-matched face feature vector needs to be compared with all vectors in a face image database. Generally, the face image database is of a large scale, and comparison with each vector in the database by using a formula s=[v1,v2]*P*[v1,v2] results in a large calculation burden and consumes a long time, which is not helpful for fast facial recognition.

SUMMARY

Embodiments of the present invention provide a method and an apparatus for determining an identity identifier of a face in a face image, and a terminal, so as to improve efficiency of facial recognition.

According to a first aspect, a method for determining an identity identifier of a face in a face image is provided, including: obtaining an original feature vector of a face image; selecting k candidate vectors from a face image database according to the original feature vector, where a vector v* in the face image database includes components [v·A,v·B·v$^T$], a feature extraction manner for v is the same as that for the original feature vector, A represents a cross-correlation submatrix in a joint Bayesian probability matrix, B represents an autocorrelation submatrix in the joint Bayesian probability matrix, and k is a positive integer; selecting a matching vector of the original feature vector from the k candidate vectors, where the matching vector of the original feature vector is a candidate vector of the k candidate vectors that has a shortest cosine distance from a vector [v1,1], and v1 represents the original feature vector; and determining, according to the matching vector of the original feature vector, an identity identifier that is of the matching vector and that is recorded in the face image database as an identity identifier of a face in the face image.

With reference to the first aspect, in an implementation of the first aspect, the obtaining an original feature vector of a face image includes: tracking locations of the face in different video images to obtain N consecutive frames of face images; and obtaining the original feature vector from a t$^{th}$ frame of face image of the N frames of face images, where 1≤t<N; and the method further includes: storing, into a cache database, the matching vector of the original feature vector and the identity identifier that is of the matching vector and that is recorded in the face image database; obtaining an original feature vector of a $(t+1)^{th}$ frame of face image of the N frames of face images, where the $(t+1)^{th}$ frame of face image is a next frame of face image of the $t^{th}$ frame of face image; selecting a target vector from the cache database according to the original feature vector of the $(t+1)^{th}$ frame of face image, where the cache database includes the matching vector of the original feature vector of the $t^{th}$ frame of face image; and when a target distance between the original feature vector of the $(t+1)^{th}$ frame of face image and the target vector is less than a preset threshold, determining an identity identifier that is of the target vector and that is recorded in the cache database as an identity identifier of a face in the $(t+1)^{th}$ frame of face image.

With reference to the first aspect or the foregoing implementation, in another implementation of the first aspect, the selecting a target vector from the cache database according to the original feature vector of the $(t+1)^{th}$ frame of face image includes: selecting the target vector from the cache database according to a formula $s=[v2,1]\cdot(v^*_c)^T+v2\cdot B\cdot v2^T$, where v2 represents the original feature vector of the $(t+1)^{th}$ frame of face image, $v^*_c$ represents a vector in the cache database, and s represents a target distance between v2 and $v^*_c$.

With reference to any one of the first aspect, or the foregoing implementations of the first aspect, in another implementation of the first aspect, the selecting k candidate vectors from a face image database according to the original feature vector includes: selecting the k candidate vectors from the face image database according to a formula $s^*=\|[v1,0]-v^*\|_2$ by using a kd-tree algorithm, where $s^*$ represents a Euclidean distance between [v1,0] and $v^*$.

With reference to any one of the first aspect, or the foregoing implementations of the first aspect, in another implementation of the first aspect, the selecting a matching vector of the original feature vector from the k candidate vectors includes: selecting the matching vector of the original feature vector from the k candidate vectors according to a formula $s^{**}=-((s^*_i)^2-(\|v^*_i\|_2)^2-(\|v1\|_2)^2)+c\cdot v1\cdot B\cdot v1^T$, where $v^*_i$ represents an $i^{th}$ candidate vector of the k candidate vectors, $s^{**}$ represents a cosine distance between [v1,1] and $v^*_i$, $s^*_i=\|[v1,0]-v^*_i\|_2$, $s^*_i$ represents a Euclidean distance between [v1,0] and $v^*_i$, $1 \leq i \leq k$, and c is a constant.

With reference to any one of the first aspect, or the foregoing implementations of the first aspect, in another implementation of the first aspect, the method is executed by a server; and the obtaining an original feature vector of a face image includes: obtaining, by the server, a vector v' from a terminal, where $v'=[v1,v1\cdot B\cdot v1^T]$, and extracting, by the server, the original feature vector from the vector v'.

According to a second aspect, a method for determining an identity identifier of a face in a face image is provided, including: obtaining an original feature vector of a face image; selecting a target vector from a face image database according to a formula $s=[v2,1]\cdot(v^*_c)^T+v2\cdot B\cdot v2^T$, where v2 represents the original feature vector, $v^*_c$ represents a vector in the face image database, $v^*_c$ includes components $[v\cdot A, v\cdot B\cdot v^T]$, a feature extraction manner for v is the same as that for the original feature vector, A represents a cross-correlation submatrix in a joint Bayesian probability matrix, B represents an autocorrelation submatrix in the joint Bayesian probability matrix, s represents a target distance between v2 and $v^*_c$, and the target vector is a vector that is in the face image database and that has a smallest target distance from v2; and when a target distance between the original feature vector and the target vector is less than a preset threshold, determining an identity identifier that is of the target vector and that is recorded in the face image database as an identity identifier of a face in the face image.

According to a third aspect, an apparatus for determining an identity identifier of a face in a face image is provided, including: a first obtaining unit, configured to obtain an original feature vector of a face image; a first selection unit, configured to select k candidate vectors from a face image database according to the original feature vector, where a vector $v^*$ in the face image database includes components $[v\cdot A, v\cdot B\cdot v^T]$, a feature extraction manner for v is the same as that for the original feature vector, A represents a cross-correlation submatrix in a joint Bayesian probability matrix, B represents an autocorrelation submatrix in the joint Bayesian probability matrix, and k is a positive integer; a second selection unit, configured to select a matching vector of the original feature vector from the k candidate vectors, where the matching vector of the original feature vector is a candidate vector of the k candidate vectors that has a shortest cosine distance from a vector [v1,1], and v1 represents the original feature vector; and a first determining unit, configured to determine, according to the matching vector of the original feature vector, an identity identifier that is of the matching vector and that is recorded in the face image database as an identity identifier of a face in the face image.

With reference to the third aspect, in a first implementation of the third aspect, the first obtaining unit is specifically configured to track locations of the face in different video images to obtain N consecutive frames of face images, and obtain the original feature vector from a $t^{th}$ frame of face image of the N frames of face images, where $1 \leq t < N$; and the apparatus further includes: an access unit, configured to store, into a cache database, the matching vector of the original feature vector and the identity identifier that is of the matching vector and that is recorded in the face image database; a second obtaining unit, configured to obtain an original feature vector of a $(t+1)^{th}$ frame of face image of the N frames of face images, where the $(t+1)^{th}$ frame of face image is a next frame of face image of the $t^{th}$ frame of face image; a third selection unit, configured to select a target vector from the cache database according to the original feature vector of the $(t+1)^{th}$ frame of face image, where the cache database includes the matching vector of the original feature vector of the $t^{th}$ frame of face image; and a second determining unit, configured to: when a target distance between the original feature vector of the $(t+1)^{th}$ frame of face image and the target vector is less than a preset threshold, determine an identity identifier that is of the target vector and that is recorded in the cache database as an identity identifier of a face in the $(t+1)^{th}$ frame of face image.

With reference to the third aspect or the foregoing implementation of the third aspect, in another implementation of the third aspect, the third selection unit is specifically configured to select the target vector from the cache database according to a formula $s=[v2,1]\cdot(v^*_c)^T+v2\cdot B\cdot v2^T$, where v2 represents the original feature vector of the $(t+1)^{th}$ frame of face image, $v^*_c$ represents a vector in the cache database, and s represents a target distance between v2 and $v^*_c$.

With reference to any one of the third aspect, or the foregoing implementations of the third aspect, in another implementation of the third aspect, the first selection unit is specifically configured to select the k candidate vectors from the face image database according to a formula $s^*=\|[v1,0]-v^*\|_2$ by using a kd-tree algorithm, where $s^*$ represents a Euclidean distance between [v1,0] and $v^*$.

With reference to any one of the third aspect, or the foregoing implementations of the third aspect, in another implementation of the third aspect, the second selection unit is specifically configured to select the matching vector of the original feature vector from the k candidate vectors according to a formula $s^{**}=-((s^*_i)^2-(\|v^*_i\|_2)^2-(\|v1\|_2)^2)+c \cdot v1 \cdot B \cdot v1^T$, where $v^*_i$ represents an $i^{th}$ candidate vector of the k candidate vectors, $s^{**}$ represents a cosine distance between $[v1,1]$ and $v^*_i$, $s^*_i=\|[v1,0]-v^*_i\|_2$, $s^*_i$ represents a Euclidean distance between $[v1,0]$ and $v^*_i$, $1 \le i \le k$, and c is a constant.

With reference to any one of the third aspect, or the foregoing implementations of the third aspect, in another implementation of the third aspect, the apparatus is a server; and the first obtaining unit is specifically configured to obtain a vector v' from a terminal, where $v'=[v1,v1 \cdot B \cdot v1^T]$, and extract the original feature vector from the vector v'.

According to a fourth aspect, an apparatus for determining an identity identifier of a face in a face image is provided, including: an obtaining unit, configured to obtain an original feature vector of a face image; a selection unit, configured to select a target vector from a face image database according to a formula $s=[v2,1] \cdot (v^*_c)^T+v2 \cdot B \cdot v2^T$, where v2 represents the original feature vector, $v^*_c$ represents a vector in the face image database, $v^*_c$ includes components $[v \cdot A, v \cdot B \cdot v^T]$, a feature extraction manner for v is the same as that for the original feature vector, A represents a cross-correlation submatrix in a joint Bayesian probability matrix, B represents an autocorrelation submatrix in the joint Bayesian probability matrix, s represents a target distance between v2 and $v^*_c$, and the target vector is a vector that is in the face image database and that has a smallest target distance from v2; and a determining unit, configured to: when a target distance between the original feature vector and the target vector is less than a preset threshold, determine an identity identifier that is of the target vector and that is recorded in the face image database as an identity identifier of a face in the face image.

According to a fifth aspect, a terminal is provided, including: a camera, configured to collect a face image; a processor, configured to obtain an original feature vector v1 of the face image, and generate a vector v' according to the original feature vector v1, where $v'=[v1,v1 \cdot B \cdot v1^T]$ and B represents an autocorrelation submatrix in a joint Bayesian probability matrix; and a transmitter, configured to send the vector v' to a server, where the vector v' is used by the server to recognize an identity identifier of a face in the face image.

In the prior art, assuming that an original feature vector of a face image is v1 and a vector in a face image database is v, when the original feature vector v1 is compared with each vector v in the face image database, both $v \cdot A$ and $v \cdot B \cdot v^T$ need to be recalculated according to a formula $$s=[v,v1]*\begin{bmatrix} A & B \\ B & A \end{bmatrix}*[v,v1]^T = v \cdot B \cdot v^T + v1 \cdot B \cdot v1^T + 2 \cdot v \cdot A \cdot v1^T.$$

In the embodiments of the present invention, the original feature vector of the face image is first obtained, and then a matching vector of the original feature vector is selected from the face image database. A vector v* in the face image database includes components $[v \cdot A, v \cdot B \cdot v^T]$. That is, in the embodiments of the present invention, the face image database stores a medium-level feature vector formed by means of mutual interaction between a low-level face feature vector and autocorrelation and cross-correlation submatrices in a joint Bayesian probability matrix. The medium-level feature vector includes information about mutual interaction between the face feature vector and the autocorrelation and cross-correlation submatrices in the joint Bayesian probability matrix, so that efficiency of facial recognition can be improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
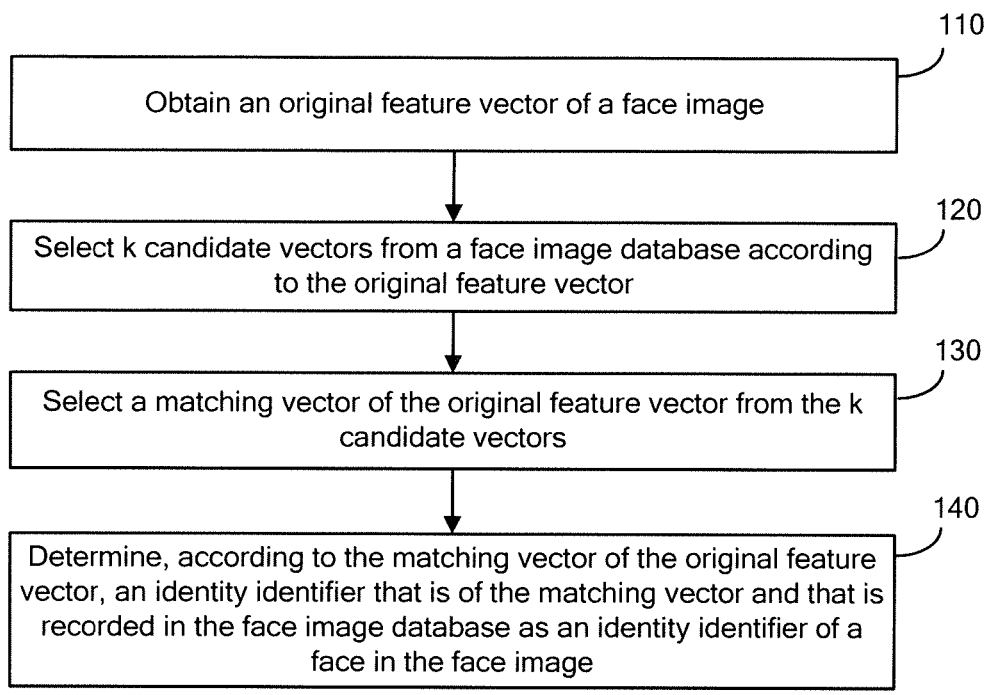
FIG. 1 is a schematic flowchart of a method for determining an identity identifier of a face in a face image according to an embodiment of the present invention.

FIG. 1 is a schematic flowchart of a method for determining an identity identifier of a face in a face image according to an embodiment of the present invention. The method in FIG. 1 includes the following steps.

110. Obtain an original feature vector of a face image.

The original feature vector may be a vector obtained by extracting a feature such as an histogram of gradient (HOG), an local binary pattern (LBP), or the like of the face image. This embodiment of the present invention imposes no specific limitation thereon.

120. Select k candidate vectors from a face image database according to the original feature vector, where a vector v* in the face image database includes components $[v \cdot A, v \cdot B \cdot v^T]$, a feature extraction manner for v is the same as that for the original feature vector, A represents a cross-correlation submatrix in a joint Bayesian probability matrix, B represents an autocorrelation submatrix in the joint Bayesian probability matrix, and k is a positive integer.

That v* includes components [v·A,v·B·v$^T$] means that at least some components in v* are [v·A,v·B·v$^T$]. For example, assuming that [v·A,v·B·v$^T$]=[2221], v* may be equal to [2221], or v*=[22210], provided that v* includes [2221].

In the prior art, a feature vector that is obtained in a same feature extraction manner as the original feature vector is stored in a face image database. Assuming that the original feature vector is represented by v1 and the feature vector stored in the face image database is represented by v, the following formula (3) may be obtained by expanding a formula (2):

$$s=v\cdot B\cdot v^T+v1\cdot B\cdot v1^T+2\cdot v\cdot A\cdot v1^T \quad (3)$$

Because the vector v in the face image database is known, it can be seen from the formula (3) that v·B·v$^T$ and v·A in the formula (3) may be obtained by means of offline calculation. Therefore, in this embodiment of the present invention, the face image database no longer stores a feature vector v of a face but stores the vector v*, and uses [v·A,v·B·v$^T$] as the component of v*. In addition, v·A and v·B·v$^T$ in [v·A,v·B·v$^T$] are operations that need to be performed online when the formula (3) is used for facial recognition in the prior art. That is, by changing a specific form of a vector in the face image database, some operations that need to be performed online are performed offline, improving efficiency of facial recognition.

In addition, the foregoing k candidate vectors may be k candidate vectors that have a shortest Euclidean distance from a vector [v1,0] and that are in the face image database. The foregoing k candidate vectors that have a shortest Euclidean distance from the original feature vector are the first k vectors, in the face image database, sorted in ascending order according to Euclidean distances from the original feature vector. The k candidate vectors having the shortest Euclidean distance from the vector [v1,0] may be selected from the face image database in multiple manners. The following gives two specific implementations.

Optionally, in an implementation, the vector [v1,0] may be compared with each vector in the face image database to find k vectors having a shortest Euclidean distance and use the k vectors as candidate vectors.

Optionally, in another implementation, the k candidate vectors are selected from the face image database according to a second distance formula s*=‖[v1,0]−v*‖$_2$ by using a kd-tree algorithm, where v1 represents the original feature vector, and s* represents a Euclidean distance between [v1,0] and v*. In this implementation, the k candidate vectors are found quickly by using the kd-tree algorithm. This improves algorithm efficiency compared with a manner in which vectors are compared one by one. A kd-tree is a tree that is derived from a binary search tree and that is used for multi-dimensional search. A difference between the kd-tree and a binary tree is that each node of the kd-tree represents a point in high-dimensional space (a quantity of dimensions of the space depends on a quantity of dimensions of a vector). The kd-tree converts an issue of solving a similarity between vectors into solving a distance between points in the high-dimensional space. A closer distance between two points in the high-dimensional space leads to a higher similarity between two corresponding vectors. During specific implementation, the kd-tree performs hierarchical division on the high-dimensional space by means of splitting a hyperplane, determines k nearest neighbor points corresponding to a to-be-searched point (a point representing the original feature vector), and uses vectors corresponding to the k nearest neighbor points as the k candidate vectors.

130. Select a matching vector of the original feature vector from the k candidate vectors, where the matching vector of the original feature vector is a candidate vector of the k candidate vectors that has a shortest cosine distance from a vector [v1,1], and v1 represents the original feature vector.

The matching vector of the original feature vector may be selected from the k candidate vectors in multiple manners. For example, the matching vector of the original feature vector is selected from the k candidate vectors according to a formula s**=−((s*$_i$)$^2$−(‖v*$_i$‖$_2$)$^2$−(‖v1‖$_2$)$^2$)+c·v1·B·v1$^T$, where v*$_i$ represents an i$^{th}$ candidate vector of the k candidate vectors, s** represents a cosine distance between [v1,1] and v*$_i$, s*$_i$=‖[v1,0]−v*$_i$‖$_2$, s*$_i$ represents a Euclidean distance between [v1,0] and v*$_i$, 1≤i≤k, and c is a constant.

It can be verified that the matching vector, obtained by using the foregoing formula, of the original feature vector is consistent with a matching vector result obtained based on a joint Bayesian probability model. However, the vector v*$_i$ in the face image database includes components [v$_i$·A, v$_i$·B·v$_i^T$]. This equals to that v$_i$·A and v$_i$·B·v$_i^T$ that need to be calculated online when a vector similarity is calculated by using the joint Bayesian probability model are obtained by means of offline operations and are stored to the face image database. During online calculation, only v*$_i$ needs to be obtained from the face image database, and this also equals to that operation results of v$_i$·A and v$_i$·B·v$_i^T$ are obtained, improving efficiency of facial recognition.

Further, ‖v*$_i$‖$_2$ or ‖v*$_i$‖$_2^2$ may be pre-stored to the face image database. In this way, some operations that need to be performed online are performed offline, and when the foregoing formula is used to calculate the cosine distance, ‖v*$_i$‖$_2$ or ‖v*$_i$‖$_2^2$ may be directly obtained from the database and does not need to be calculated online, further improving the efficiency of facial recognition.

140. Determine, according to the matching vector of the original feature vector, an identity identifier that is of the matching vector and that is recorded in the face image database as an identity identifier of a face in the face image.

It should be understood that an identity identifier of a face is a unique identifier of a person represented by the face, for example, an identity card number of the person.

Specifically, the face image database records a correspondence between a vector and an identity identifier. After the matching vector of the original feature vector is determined, the identity identifier of the matching vector may be found directly in the face image database, and then the identity identifier is determined as the identity identifier of the face in the face image. Alternatively, whether a cosine distance between the original feature vector and the matching vector is less than a preset threshold is first determined. If the cosine distance between the original feature vector and the matching vector is less than the preset threshold, the identity identifier of the matching vector is determined as the identity identifier of the face. If the cosine distance between the original feature vector and the matching vector is greater than the preset threshold, it indicates that the identity identifier of the face is not found in the face image database.

In the prior art, assuming that an original feature vector of a face image is v1 and a vector in a face image database is v, when the original feature vector v1 is compared with each vector v in the face image database, both v·A and v·B·v$^T$ need to be repeatedly calculated according to a formula $$s = [v, v1] * \begin{bmatrix} A & B \\ B & A \end{bmatrix} * [v, v1]^T = v \cdot B \cdot v^T + v1 \cdot B \cdot v1^T + 2 \cdot v \cdot A \cdot v1^T.$$

In this embodiment of the present invention, the original feature vector of the face image is first obtained, and then a matching vector of the original feature vector is selected from the face image database. A vector v* in the face image database includes components $[v \cdot A, v \cdot B \cdot v^T]$. That is, in this embodiment of the present invention, the face image database stores a medium-level feature vector formed by means of mutual interaction between a low-level face feature vector and autocorrelation and cross-correlation submatrices in a joint Bayesian probability matrix. The medium-level feature vector includes information about mutual interaction between the face feature vector and the autocorrelation and cross-correlation submatrices in the joint Bayesian probability matrix, so that efficiency of facial recognition can be improved.

The method in this embodiment of the present invention may be applied to facial recognition in a video. For ease of understanding, a general process of facial recognition in a video signal is briefly described.

Step 1: Face detection is performed on an initial frame, for example, a robust real-time object detection algorithm is used to perform face detection, to obtain an initial location of a face in a video image and obtain one frame of face image. Then, in a subsequent video frame, a target tracking algorithm, for example, a tracking-learning-detection algorithm, is used to track a location of the face to obtain a face tracking sequence. The tracking sequence includes multiple frames of face images.

Step 2: An original feature vector of each frame of face image in the tracking sequence is compared with all feature vectors in the face image database by using the formula (1) or the formula (2), to select an identity identifier of a face in each frame of face image. Recognized identity identifiers are counted by using a voting mechanism, and an identity identifier obtaining most votes is determined as a final identity identifier of the face. Certainly, if the identity identifier of the face is not determined in the face image database, a new identity identifier may be allocated to the face, and the new identity identifier is registered in the face image database.

The following details specific implementations of the present invention when the foregoing architecture of facial recognition in a video signal is used.

Optionally, in an embodiment, step 110 may include: tracking locations of the face in different video images to obtain N consecutive frames of images; and obtaining the original feature vector from a $t^{th}$ frame of image of the N frames of images, where $1 \leq t < N$. The method in FIG. 1 may further include: storing, into a cache database, the matching vector of the original feature vector and the identity identifier that is of the matching vector and that is recorded in the face image database; obtaining an original feature vector of a $(t+1)^{th}$ frame of face image of the N frames of face images, where the $(t+1)^{th}$ frame of face image is a next frame of face image of the $t^{th}$ frame of face image; selecting a target vector from the cache database according to the original feature vector of the $(t+1)^{th}$ frame of face image, where the cache database includes the matching vector of the original feature vector of the $t^{th}$ frame of face image; and when a target distance between the original feature vector of the $(t+1)^{th}$ frame of face image and the target vector is less than a preset threshold, determining an identity identifier that is of the target vector and that is recorded in the cache database as an identity identifier of a face in the $(t+1)^{th}$ frame of face image.

The foregoing N frames of face images form a tracking sequence of a face in a video. The foregoing $t^{th}$ frame of face image may be the first frame of face image of the N frames of face images, or may be any face image, other than the last frame of face image, of the N frames of face images. In an actual application, the N frames of face images may be arranged according to a sequence of occurrence of the N frames of face images in the video, and then faces in the face images are recognized in sequence. When facial recognition is performed for each frame of face image, the cache database is first accessed. If no face is recognized from the cache database, the face image database is continuously accessed. That is, in this embodiment of the present invention, a two-level database structure including the cache database and the face image database is introduced. In this way, a frequently accessed face image in the face image database is stored into the cache database. During actual access, the cache database is first accessed. If no face is recognized based on the cache database, the global face image database is accessed. This improves efficiency of facial recognition to a given degree.

Specifically, the N frames of face images are face images obtained by tracking a same face. Therefore, a probability that a matching result of the $t^{th}$ frame of face image is the same as that of the $(t+1)^{th}$ frame of face image is high. When the matching vector of the original feature vector of the $t^{th}$ frame of face image is found in the face image database, the matching vector is stored into the cache database. A probability that the $(t+1)^{th}$ frame of face image hits the matching vector when the cache database is first accessed is high. It should be noted that, in an actual application, both the matching vector of the original feature vector of the $t^{th}$ frame of face image and a vector that is in the face image database and whose storage location is adjacent to that of the matching vector can be stored into the cache database. (Certainly, a premise is that specific organization forms of vectors in the face image database are of a high similarity because vectors of a higher similarity have closer storage locations in the face image database.)

It should be noted that the selecting a target vector from the cache database according to the original feature vector of the $(t+1)^{th}$ frame of face image may include: selecting the target vector from the cache database according to a formula $s = [v2, 1] \cdot (v^*_c)^T + v2 \cdot B \cdot v2^T$, where v2 represents the original feature vector of the $(t+1)^{th}$ frame of face image, $v^*_c$ represents a vector in the cache database, and s represents a target distance between v2 and $v^*_c$.

In the prior art, the tracking sequence includes multiple frames of face images. Because a frame rate of a video signal is high, many face images collected in the tracking sequence are similar. If no screening is performed and all face images in the tracking sequence are used for subsequent facial recognition, facial recognition results of face images with an extremely high similarity are usually the same, and unnecessary repeated calculation is introduced.

Optionally, in an embodiment, the tracking locations of the face in different video images to obtain N consecutive frames of face images may include: obtaining M frames of face images from the video, where $M \geq N$; and deleting a redundant face image from the M frames of face images according to a similarity of faces in the M frames of face images, to obtain the N frames of face images.

That is, in this embodiment of the present invention, the M frames of face images are first collected from the video, and then some redundant face images are deleted based on a similarity of the M frames of face images. For example, if two frames of images are similar, only one of them needs to be retained. The M frames of face images form an initial tracking sequence of the faces in the video, and the N frames of face images form a final tracking sequence used for facial recognition.

A face similarity may be measured in multiple manners. For example, original feature vectors of the M frames of face images are first extracted, and then a similarity (or a distance) between two vectors is calculated by using the formula (1) or the formula (2), that is, the joint Bayesian probability model. For example, an original feature vector of a face is collected from a current frame; the original feature vector and an original feature vector of another face image that has been added to the tracking sequence are compared by using the formula (1) (the original feature vector may be compared with original feature vectors of all other face images in the tracking sequence, or may be compared with original feature vectors of several frames of face images that are consecutive in terms of time). When a comparison result is greater than a preset threshold, the current frame is added to the tracking sequence; otherwise, the current sequence is discarded.

It should be understood that the method in FIG. 1 may be executed by a cloud server. The obtaining an original feature vector of a face image in step 110 may be: obtaining, by the server, the original feature vector directly from the face image; or obtaining, by a mobile terminal, the original feature vector, and uploading the original feature vector to the server. The following provides a specific embodiment of collecting, by a terminal, an original feature vector of a face image, and uploading the original feature vector to a server: the server obtains a vector v from the terminal, where $v'=[v1, v1 \cdot B \cdot v1^T]$; and the server extracts the original feature vector from the vector v'.

Figure 2:
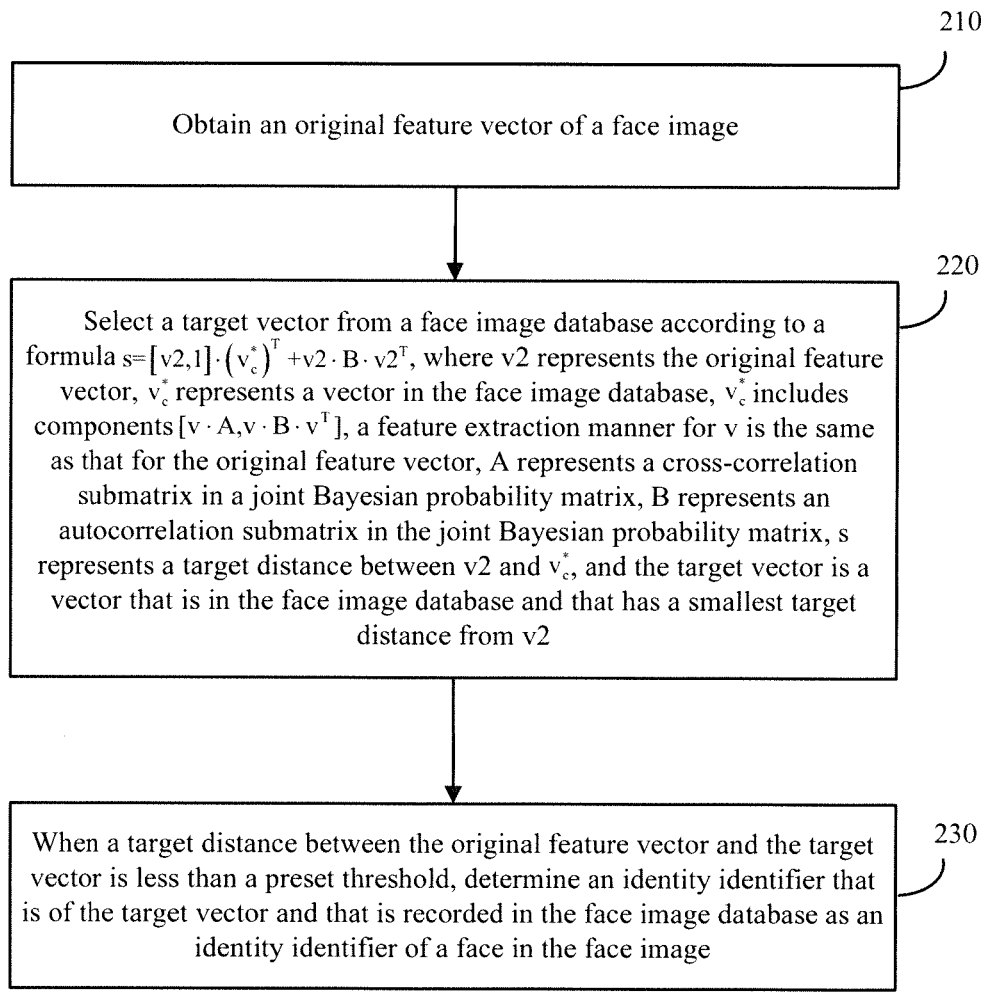
FIG. 2 is a schematic flowchart of a method for determining an identity identifier of a face in a face image according to an embodiment of the present invention.

FIG. 2 is a schematic flowchart of a method for determining an identity identifier of a face in a face image according to an embodiment of the present invention. The method in FIG. 2 includes the following steps:

210. Obtain an original feature vector of a face image.

220. Select a target vector from a face image database according to a formula $s=[v2,1] \cdot (v^*_c)^T + v2 \cdot B \cdot v2^T$, where v2 represents the original feature vector, $v^*_c$ represents a vector in the face image database, $v^*_c$ includes components [v·A, v·B·v$^T$], a feature extraction manner for v is the same as that for the original feature vector, A represents a cross-correlation submatrix in a joint Bayesian probability matrix, B represents an autocorrelation submatrix in the joint Bayesian probability matrix, s represents a target distance between v2 and $v^*_c$, and the target vector is a vector that is in the face image database and that has a smallest target distance from v2.

230. When a target distance between the original feature vector and the target vector is less than a preset threshold, determine an identity identifier that is of the target vector and that is recorded in the face image database as an identity identifier of a face in the face image.

A vector $v^*_c$ in a face image database includes components [v·A, v·B·v$^T$]. That is, the face image database stores a medium-level feature vector formed by means of mutual interaction between a low-level face feature vector and autocorrelation and cross-correlation submatrices in a joint Bayesian probability matrix. The medium-level feature vector includes information about mutual interaction between the face feature vector and the autocorrelation and cross-correlation submatrices in the joint Bayesian probability matrix, so that efficiency of facial recognition can be improved.

The method for determining an identity identifier of a face in a face image according to an embodiment of the present invention is detailed above with reference to FIG. 1 and FIG. 2. With reference to FIG. 3 to FIG. 6, the following details an apparatus for determining an identity identifier of a face in a face image according to an embodiment of the present invention.

Figure 3:
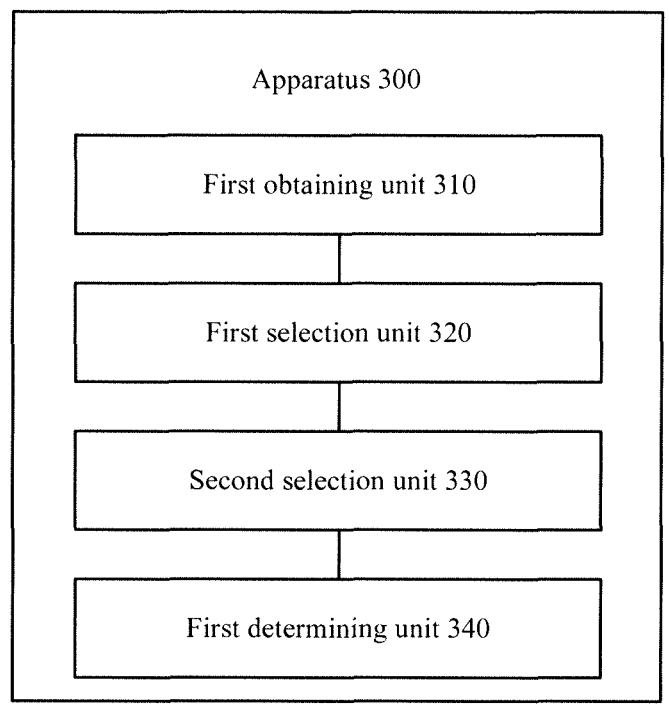
FIG. 3 is a schematic block diagram of an apparatus for determining an identity identifier of a face in a face image according to an embodiment of the present invention.

FIG. 3 is a schematic block diagram of an apparatus for determining an identity identifier of a face in a face image according to an embodiment of the present invention. It should be understood that the apparatus 300 in FIG. 3 can implement the steps described in FIG. 1. To avoid repetition, details are not described herein again. The apparatus 300 includes:

a first obtaining unit 310, configured to obtain an original feature vector of a face image;

a first selection unit 320, configured to select k candidate vectors from a face image database according to the original feature vector, where a vector v* in the face image database includes components [v·A, v·B·v$^T$], a feature extraction manner for v is the same as that for the original feature vector, A represents a cross-correlation submatrix in a joint Bayesian probability matrix, B represents an autocorrelation submatrix in the joint Bayesian probability matrix, and k is a positive integer;

a second selection unit 330, configured to select a matching vector of the original feature vector from the k candidate vectors, where the matching vector of the original feature vector is a candidate vector of the k candidate vectors that has a shortest cosine distance from a vector [v1,1], and v1 represents the original feature vector; and a first determining unit 340, configured to determine, according to the matching vector of the original feature vector, an identity identifier that is of the matching vector and that is recorded in the face image database as an identity identifier of a face in the face image.

In the prior art, assuming that an original feature vector of a face image is v1 and a vector in a face image database is v, when the original feature vector v1 is compared with each vector v in the face image database, both v·A and v·B·v$^T$ need to be repeatedly calculated according to a formula $$s = [v, v1] * \begin{bmatrix} A & B \\ B & A \end{bmatrix} * [v, v1]^T = v \cdot B \cdot v^T + v1 \cdot B \cdot v1^T + 2 \cdot v \cdot A \cdot v1^T.$$

In this embodiment of the present invention, the original feature vector of the face image is first obtained, and then a matching vector of the original feature vector is selected from the face image database. A vector v* in the face image database includes components [v·A, v·B·v$^T$]. That is, in this embodiment of the present invention, the face image database stores a medium-level feature vector formed by means of mutual interaction between a low-level face feature vector and autocorrelation and cross-correlation submatrices in a joint Bayesian probability matrix. The medium-level feature vector includes information about mutual interaction between the face feature vector and the autocorrelation and cross-correlation submatrices in the joint Bayesian probability matrix, so that efficiency of facial recognition can be improved.

Optionally, in an embodiment, the first obtaining unit 310 is specifically configured to track locations of the face in different video images to obtain N consecutive frames of face images, and obtain the original feature vector from a t$^{th}$ frame of face image of the N frames of face images, where 1≤t<N; and the apparatus 300 further includes: an access unit, configured to store, into a cache database, the matching vector of the original feature vector and the identity identifier that is of the matching vector and that is recorded in the face image database; a second obtaining unit, configured to obtain an original feature vector of a $(t+1)^{th}$ frame of face image of the N frames of face images, where the $(t+1)^{th}$ frame of face image is a next frame of face image of the $t^{th}$ frame of face image; a third selection unit, configured to select a target vector from the cache database according to the original feature vector of the $(t+1)^{th}$ frame of face image, where the cache database includes the matching vector of the original feature vector of the $t^{th}$ frame of face image; and a second determining unit, configured to: when a target distance between the original feature vector of the $(t+1)^{th}$ frame of face image and the target vector is less than a preset threshold, determine an identity identifier that is of the target vector and that is recorded in the cache database as an identity identifier of a face in the $(t+1)^{th}$ frame of face image.

Optionally, in an embodiment, the third selection unit is specifically configured to select the target vector from the cache database according to a formula $s=[v2,1] \cdot (v^*_c)^T + v2 \cdot B \cdot v2^T$, where v2 represents the original feature vector of the $(t+1)^{th}$ frame of face image, $v^*_c$ represents a vector in the cache database, and s represents a target distance between v2 and $v^*_c$.

Optionally, in an embodiment, the first selection unit 320 is specifically configured to select the k candidate vectors from the face image database according to a formula $s^* = \|[v1,0] - v^*\|_2$ by using a kd-tree algorithm, where s represents a Euclidean distance between [v1,0] and v*.

Optionally, in an embodiment, the second selection unit 330 is specifically configured to select the matching vector of the original feature vector from the k candidate vectors according to a formula $s^{**} = -((s^*_i)^2 - (\|v^*_i\|_2)^2 - (\|v1\|_2)^2) + c \cdot v1 \cdot B \cdot v1^T$, where $v^*_i$ represents an $i^{th}$ candidate vector of the k candidate vectors, $s^{**}$ represents a cosine distance between [v1,1] and $v^*_i$, $s^*_i = \|[v1,0] - v^*_i\|_2$, $s^*_i$ represents a Euclidean distance between [v1,0] and $v^*_i$, $1 \le i \le k$, and c is a constant.

Optionally, in an embodiment, the apparatus 300 is a server; and the first obtaining unit 310 is specifically configured to obtain a vector v' from a terminal, where $v'=[v1, v1 \cdot B \cdot v1^T]$, and extract the original feature vector from the vector v'.

Figure 4:
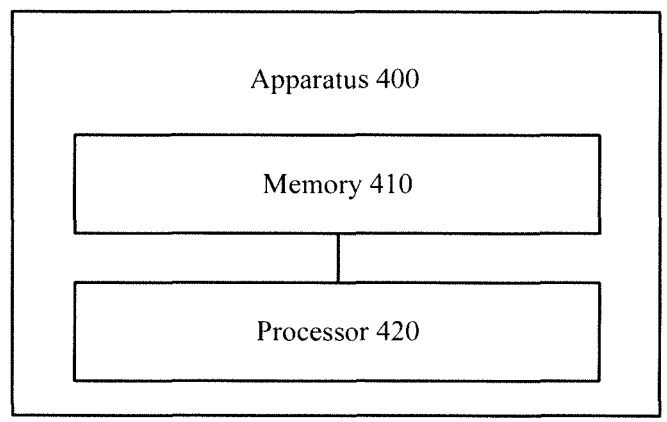
FIG. 4 is a schematic block diagram of an apparatus for determining an identity identifier of a face in a face image according to an embodiment of the present invention.

FIG. 4 is a schematic block diagram of an apparatus for determining an identity identifier of a face in a face image according to an embodiment of the present invention. It should be understood that the apparatus 400 in FIG. 4 can implement the steps described in FIG. 1. To avoid repetition, details are not described herein again. The apparatus 400 includes:

a memory 410, configured to store a program; and a processor 420, configured to execute the program, where when the program is executed, the processor 420 is specifically configured to: obtain an original feature vector of a face image; select k candidate vectors from a face image database according to the original feature vector, where a vector v* in the face image database includes components $[v \cdot A, v \cdot B \cdot v^T]$, a feature extraction manner for v is the same as that for the original feature vector, A represents a crosscorrelation submatrix in a joint Bayesian probability matrix, B represents an autocorrelation submatrix in the joint Bayesian probability matrix, and k is a positive integer; select a matching vector of the original feature vector from the k candidate vectors, where the matching vector of the original feature vector is a candidate vector of the k candidate vectors that has a shortest cosine distance from a vector [v1,1], and v1 represents the original feature vector; and determine, according to the matching vector of the original feature vector, an identity identifier that is of the matching vector and that is recorded in the face image database as an identity identifier of a face in the face image.

In the prior art, assuming that an original feature vector of a face image is v1 and a vector in a face image database is v, when the original feature vector v1 is compared with each vector v in the face image database, both $v \cdot A$ and $v \cdot B \cdot v^T$ need to be repeatedly calculated according to a formula $$s = [v, v1] * \begin{bmatrix} A & B \\ B & A \end{bmatrix} * [v, v1]^T = v \cdot B \cdot v^T + v1 \cdot B \cdot v1^T + 2 \cdot v \cdot A \cdot v1^T.$$

In this embodiment of the present invention, the original feature vector of the face image is first obtained, and then a matching vector of the original feature vector is selected from the face image database. A vector v* in the face image database includes components $[v \cdot A, v \cdot B \cdot v^T]$. That is, in this embodiment of the present invention, the face image database stores a medium-level feature vector formed by means of mutual interaction between a low-level face feature vector and autocorrelation and cross-correlation submatrices in a joint Bayesian probability matrix. The medium-level feature vector includes information about mutual interaction between the face feature vector and the autocorrelation and cross-correlation submatrices in the joint Bayesian probability matrix, so that efficiency of facial recognition can be improved.

Optionally, in an embodiment, the processor 420 is specifically configured to track locations of the face in different video images to obtain N consecutive frames of face images, and obtain the original feature vector from a $t^{th}$ frame of face image of the N frames of face images, where $1 \le t < N$; and the processor 420 is further configured to: store, into a cache database, the matching vector of the original feature vector and the identity identifier that is of the matching vector and that is recorded in the face image database; obtain an original feature vector of a $(t+1)^{th}$ frame of face image of the N frames of face images, where the $(t+1)^{th}$ frame of face image is a next frame of face image of the $t^{th}$ frame of face image; select a target vector from the cache database according to the original feature vector of the $(t+1)^{th}$ frame of face image, where the cache database includes the matching vector of the original feature vector of the $t^{th}$ frame of face image; and when a target distance between the original feature vector of the $(t+1)^{th}$ frame of face image and the target vector is less than a preset threshold, determine an identity identifier that is of the target vector and that is recorded in the cache database as an identity identifier of a face in the $(t+1)^{th}$ frame of face image.

Optionally, in an embodiment, the processor 420 is specifically configured to select the target vector from the cache database according to a formula $s=[v2,1] \cdot (v^*_c)^T + v2 \cdot B \cdot v2^T$, where v2 represents the original feature vector of the $(t+1)^{th}$ frame of face image, $v^*_c$ represents a vector in the cache database, and s represents a target distance between v2 and $v^*_c$.

Optionally, in an embodiment, the processor 420 is specifically configured to select the k candidate vectors from the face image database according to a formula $s^* = \|[v1,0] - v^*\|_2$ by using a kd-tree algorithm, where s* represents a Euclidean distance between [v1,0] and v*.

Optionally, in an embodiment, the processor 420 is specifically configured to select the matching vector of the original feature vector from the k candidate vectors according to a formula $s^{**}=-((s^*_i)^2-(\|v^*_i\|_2)^2-(\|v1\|_2)^2)+c \cdot v1 \cdot B \cdot v1^T$, where $v^*_i$ represents an $i^{th}$ candidate vector of the k candidate vectors, $s^{**}$ represents a cosine distance between [v1,1] and $v^*_i$, $s^*_i=\|[v1,0]-v^*_i\|_2$, $s^*_i$ represents a Euclidean distance between [v1,0] and $v^*_i$, $1 \le i \le k$, and c is a constant.

Optionally, in an embodiment, the apparatus 400 is a server; and the processor 420 is specifically configured to obtain a vector v' from a terminal by using a receiver, where $v'=[v1,v1 \cdot B \cdot v1^T]$, and extract the original feature vector from the vector v'.

Figure 5:
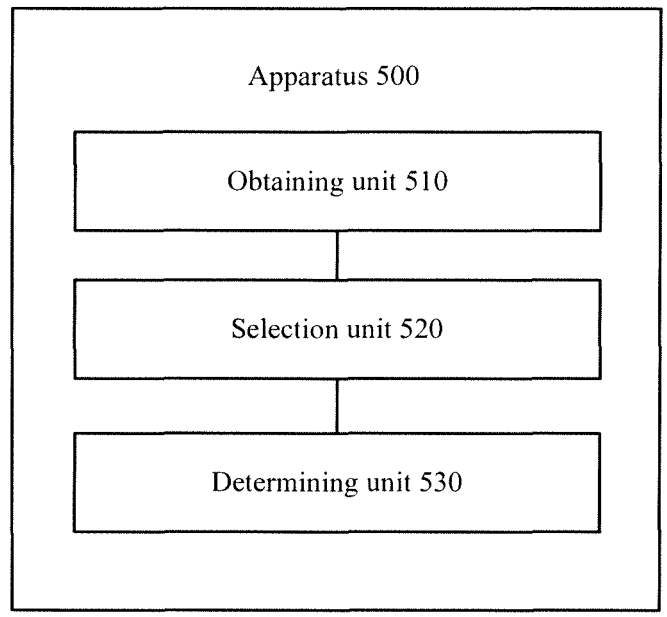
FIG. 5 is a schematic block diagram of an apparatus for determining an identity identifier of a face in a face image according to an embodiment of the present invention.

FIG. 5 is a schematic block diagram of an apparatus for determining an identity identifier of a face in a face image according to an embodiment of the present invention. It should be understood that the apparatus 500 in FIG. 5 can implement the steps described in FIG. 2. To avoid repetition, details are not described herein again. The apparatus 500 includes:

an obtaining unit 510, configured to obtain an original feature vector of a face image;

a selection unit 520, configured to select a target vector from a face image database according to a formula $s=[v2,1] \cdot (v^*_c)^T+v2 \cdot B \cdot v2^T$, where v2 represents the original feature vector, $v^*_c$ represents a vector in the face image database, s represents a target distance between v2 and $v^*_c$, the target vector is a vector that is in the face image database and that has a smallest target distance from v2, and B represents an autocorrelation submatrix in a joint Bayesian probability matrix; and a determining unit 530, configured to: when a target distance between the original feature vector and the target vector is less than a preset threshold, determine an identity identifier that is of the target vector and that is recorded in the face image database as an identity identifier of a face in the face image.

A vector $v^*_c$ in a face image database includes components $[v \cdot A, v \cdot B \cdot v^T]$. That is, the face image database stores a medium-level feature vector formed by means of mutual interaction between a low-level face feature vector and autocorrelation and cross-correlation submatrices in a joint Bayesian probability matrix. The medium-level feature vector includes information about mutual interaction between the face feature vector and the autocorrelation and cross-correlation submatrices in the joint Bayesian probability matrix, so that efficiency of facial recognition can be improved.

Figure 6:
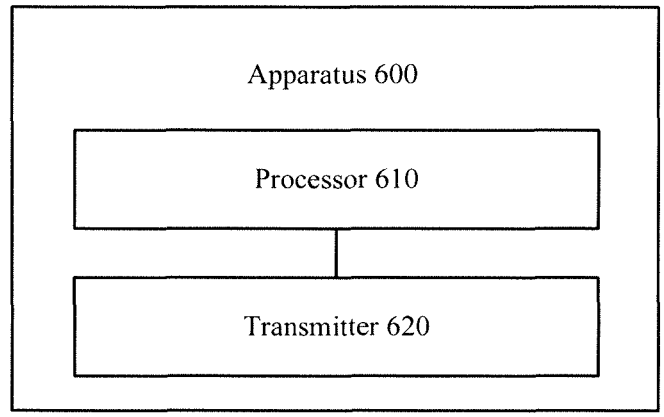
FIG. 6 is a schematic block diagram of an apparatus for determining an identity identifier of a face in a face image according to an embodiment of the present invention.

FIG. 6 is a schematic block diagram of an apparatus for determining an identity identifier of a face in a face image according to an embodiment of the present invention. It should be understood that the apparatus 600 in FIG. 6 can implement the steps described in FIG. 2. To avoid repetition, details are not described herein again. The apparatus 600 includes:

a memory 610, configured to store a program; and a processor 620, configured to execute the program, where when the program is executed, the processor 620 is specifically configured to: obtain an original feature vector of a face image; select a target vector from a face image database according to a formula $s=[v2,1] \cdot (v^*_c)^T+v2 \cdot B \cdot v2^T$, where v2 represents the original feature vector, $v^*_c$ represents a vector in the face image database, s represents a target distance between $v^*_c$ and v*, the target vector is a vector that is in the face image database and that has a smallest target distance from v2, and B represents an autocorrelation submatrix in a joint Bayesian probability matrix; and when a target distance between the original feature vector and the target vector is less than a preset threshold, determine an identity identifier that is of the target vector and that is recorded in the face image database as an identity identifier of a face in the face image.

A vector $v^*_c$ in a face image database includes components $[v \cdot A, v \cdot B \cdot v^T]$. That is, the face image database stores a medium-level feature vector formed by means of mutual interaction between a low-level face feature vector and autocorrelation and cross-correlation submatrices in a joint Bayesian probability matrix. The medium-level feature vector includes information about mutual interaction between the face feature vector and the autocorrelation and cross-correlation submatrices in the joint Bayesian probability matrix, so that efficiency of facial recognition can be improved.

Figure 7:
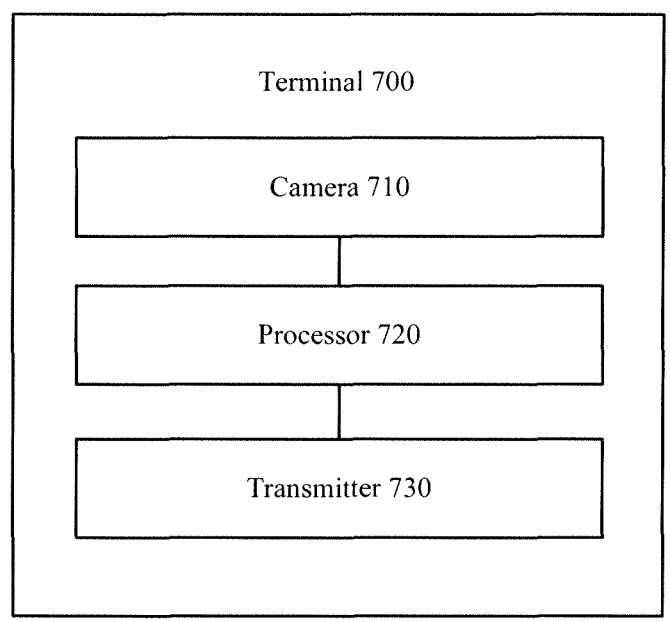
FIG. 7 is a schematic block diagram of a terminal according to an embodiment of the present invention.

FIG. 7 is a schematic block diagram of a terminal according to an embodiment of the present invention. The terminal 700 in FIG. 7 includes:

a camera 710, configured to collect a face image;

a processor 720, configured to obtain an original feature vector v1 of the face image, and generate a vector v' according to the original feature vector v1, where $v'=[v1, v1 \cdot B \cdot v1^T]$ and B represents an autocorrelation submatrix in a joint Bayesian probability matrix; and a transmitter 730, configured to send the vector v' to a server, where the vector v' is used by the server to recognize an identity identifier of a face in the face image.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining an identity identifier of a face in a face image, comprising:
    obtaining an original feature vector of a face image, comprising:
        tracking locations of the face in different video images to obtain N consecutive frames of face images; and
        obtaining the original feature vector from a $t^{th}$ frame of face image of the N frames of face images, wherein $1 \leq t < N$;
    selecting k candidate vectors from a face image database according to the original feature vector, wherein a vector v* in the face image database comprises components $[v \cdot A, v \cdot B \cdot v^T]$, a feature extraction manner for v is the same as that for the original feature vector, A represents a cross-correlation submatrix in a joint Bayesian probability matrix, B represents an autocorrelation submatrix in the joint Bayesian probability matrix, and k is a positive integer;
    selecting a matching vector of the original feature vector from the k candidate vectors, wherein the matching vector of the original feature vector is a candidate vector of the k candidate vectors that has a shortest cosine distance from a vector [v1,1], and v1 represents the original feature vector; determining, according to the matching vector of the original feature vector, an identity identifier that is of the matching vector and that is recorded in the face image database as an identity identifier of a face in the face image;
    storing, into a cache database, the matching vector of the original feature vector and the identity identifier that is of the matching vector and that is recorded in the face image database;
    obtaining an original feature vector of a $(t+1)^{th}$ frame of face image of the N frames of face images, wherein the $(t+1)^{th}$ frame of face image is a next frame of face image of the $t^{th}$ frame of face image;
    selecting a target vector from the cache database according to the original feature vector of the $(t+1)^{th}$ frame of face image, wherein the cache database comprises the matching vector of the original feature vector of the $t^{th}$ frame of face image; and
    when a target distance between the original feature vector of the $(t+1)^{th}$ frame of face image and the target vector is less than a preset threshold, determining an identity identifier that is of the target vector and that is recorded in the cache database as an identity identifier of a face in the $(t+1)^{th}$ frame of face image.

2. The method according to claim 1, wherein the selecting a target vector from the cache database according to the original feature vector of the $(t+1)^{th}$ frame of face image comprises:
    selecting the target vector from the cache database according to a formula $s=[v2,1] \cdot (v^*_c)^T + v2 \cdot B \cdot v2^T$, wherein v2 represents the original feature vector of the $(t+1)^{th}$ frame of face image, $v^*_c$ represents a vector in the cache database, and s represents a target distance between v2 and $v^*_c$.

3. The method according to claim 1, wherein the selecting k candidate vectors from a face image database according to the original feature vector comprises:
    selecting the k candidate vectors from the face image database according to a formula $s^*=\|[v1,0]-v^*\|_2$ by using a kd-tree algorithm, wherein s* represents a Euclidean distance between [v1,0] and v*.

4. The method according to claim 1, wherein the selecting a matching vector of the original feature vector from the k candidate vectors comprises:
    selecting the matching vector of the original feature vector from the k candidate vectors according to a formula $s^{**}=-((s^*_i)^2-(\|v^*_i\|_2)^2-(\|v1\|_2)^2)+c \cdot v1 \cdot B \cdot v1^T$, wherein $v^*_i$ represents an $i^{th}$ candidate vector of the k candidate vectors, s** represents a cosine distance between [v1,1] and $v^*_i$, $s^*_i=\|[v1,0]-v^*_i\|_2$, $s^*_i$ represents a Euclidean distance between [v1,0] and $v^*_i$, $1 \leq i \leq k$, and c is a constant.

5. The method according to claim 1, wherein the method is executed by a server; and
    the obtaining an original feature vector of a face image comprises:
        obtaining, by the server, a vector v' from a terminal, wherein $v'=[v1, v1 \cdot B \cdot v1^T]$; and
        extracting, by the server, the original feature vector from the vector v'.

6. A method for determining an identity identifier of a face in a face image, comprising:
    obtaining an original feature vector of a face image;
    selecting a target vector from a face image database according to a formula $s=[v2,1] \cdot (v^*_c)^T + v2 \cdot B \cdot v2^T$, wherein v2 represents the original feature vector, $v^*_c$ represents a vector in the face image database, $v^*_c$ comprises components $[v \cdot A, v \cdot B \cdot v^T]$, a feature extraction manner for v is the same as that for the original feature vector, A represents a cross-correlation submatrix in a joint Bayesian probability matrix, B represents an autocorrelation submatrix in the joint Bayesian probability matrix, s represents a target distance between v2 and $v^*_c$, and the target vector is a vector that is in the face image database and that has a smallest target distance from v2; and
    when a target distance between the original feature vector and the target vector is less than a preset threshold, determining an identity identifier that is of the target vector and that is recorded in the face image database as an identity identifier of a face in the face image.

7. An apparatus for determining an identity identifier of a face in a face image, comprising:
   a memory to store instructions; and
   a processor to execute the instructions to cause the apparatus to:
   obtain an original feature vector of a face image, comprising track locations of the face in different video images to obtain N consecutive frames of face images, and obtain the original feature vector from a $t^{th}$ frame of face image of the N frames of face images, wherein $1 \leq t < N$;
   select k candidate vectors from a face image database according to the original feature vector, wherein a vector v in the face image database comprises components $[v \cdot A, v \cdot B \cdot v^T]$, a feature extraction manner for v is the same as that for the original feature vector, A represents a cross-correlation submatrix in a joint Bayesian probability matrix, B represents an autocorrelation submatrix in the joint Bayesian probability matrix, and k is a positive integer;
   select a matching vector of the original feature vector from the k candidate vectors, wherein the matching vector of the original feature vector is a candidate vector of the k candidate vectors that has a shortest cosine distance from a vector [v1,1], and v1 represents the original feature vector;
   determine, according to the matching vector of the original feature vector, an identity identifier that is of the matching vector and that is recorded in the face image database as an identity identifier of a face in the face image;
   store, into a cache database, the matching vector of the original feature vector and the identity identifier that is of the matching vector and that is recorded in the face image database;
   obtain an original feature vector of a $(t+1)^{th}$ frame of face image of the N frames of face images, wherein the $(t+1)^{th}$ frame of face image is a next frame of face image of the $t^{th}$ frame of face image;
   select a target vector from the cache database according to the original feature vector of the $(t+1)^{th}$ frame of face image, wherein the cache database comprises the matching vector of the original feature vector of the $t^{th}$ frame of face image; and
   when a target distance between the original feature vector of the $(t+1)^{th}$ frame of face image and the target vector is less than a preset threshold, determine an identity identifier that is of the target vector and that is recorded in the cache database as an identity identifier of a face in the $(t+1)^{th}$ frame of face image.

8. The apparatus according to claim 7, wherein the processor further executes the instructions to cause the apparatus to select the target vector from the cache database according to a formula $s=[v2,1] \cdot (v^*_c)^T + v2 \cdot B \cdot v2^T$, wherein v2 represents the original feature vector of the $(t+1)^{th}$ frame of face image, $v^*_c$ represents a vector in the cache database, and s represents a target distance between v2 and $v^*_c$.

9. The apparatus according to claim 7, wherein the processor further executes the instructions to cause the apparatus to select the k candidate vectors from the face image database according to a formula $s^* = \|[v1,0] - v^*\|_2$ by using a kd-tree algorithm, wherein S represents a Euclidean distance between [v1,0] and $v^*$.

10. The apparatus according to claim 7, wherein the processor further executes the instructions to cause the apparatus to select the matching vector of the original feature vector from the k candidate vectors according to a formula) $s^{**} = -((s^*_i)^2 - (\|v^*_i\|_2)^2 - (\|v1\|_2)^2) + c \cdot v1 \cdot B \cdot v1^T$, wherein $v^*_i$ represents an $i^{th}$ candidate vector of the k candidate vectors, $s^{**}$ represents a cosine distance between [v1,1] and $v^*_i$, $s^*_i = \|[v1,0] - v^*_i\|_2$, $s^*_i$ represents a Euclidean distance between [v1,0] and $v^*_i$, $1 \leq i \leq k$, and c is a constant.

11. The apparatus according to claim 7, wherein the apparatus is a server; and
   the processor further executes the instructions to cause the apparatus to obtain a vector v' from a terminal, wherein $v' = [v1, v1 \cdot B \cdot v1^T]$; and extract the original feature vector from the vector v'.

12. A terminal, comprising:
   a camera, configured to collect a face image;
   a processor, configured to obtain an original feature vector v1 of the face image, and generate a vector v' according to the original feature vector v1, wherein $v40 = [v1, v1 \cdot B \cdot v1^T]$ and B represents an autocorrelation submatrix in a joint Bayesian probability matrix; and
   a transmitter, configured to send the vector v' to a server, wherein the vector v40 is used by the server to recognize an identity identifier of a face in the face image.

* * * * *

UNITED STATES PATENT AND TRADEMARK OFFICE
CERTIFICATE OF CORRECTION

PATENT NO. : 10,402,627 B2
APPLICATION NO. : 15/639220
DATED : September 3, 2019
INVENTOR(S) : Wenqi Ju, Wei Li and Chunjing Xu Page 1 of 1

It is certified that error appears in the above-identified patent and that said Letters Patent is hereby corrected as shown below:

In the Claims

Claim 7, Column 19, Line 14: "v" should read "v*"

Claim 9, Column 20, Line 18: "S" should read "s*"

Claim 12, Column 20, Line 39: "v40" should read "v'"

Claim 12, Column 20, Line 43: "v40" should read "v'"

Signed and Sealed this
Eighth Day of October, 2019

Andrei Iancu
*Director of the United States Patent and Trademark Office*